US010754158B2

(12) United States Patent
Seo

(10) Patent No.: US 10,754,158 B2
(45) Date of Patent: *Aug. 25, 2020

(54) HEAD-MOUNTED DISPLAY DEVICE

(71) Applicant: Samsung Display Co., Ltd., Yongin-Si, Gyeonggi-Do (KR)

(72) Inventor: Jeong Eun Seo, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,158

(22) Filed: Jan. 22, 2018

(65) Prior Publication Data

US 2018/0143441 A1 May 24, 2018

Related U.S. Application Data

(63) Continuation of application No. 14/749,210, filed on Jun. 24, 2015, now Pat. No. 9,874,750.

(30) Foreign Application Priority Data

Jan. 9, 2015 (KR) .................. 10-2015-0003527

(51) Int. Cl.
*G02B 27/14* (2006.01)
*G02B 27/01* (2006.01)

(52) U.S. Cl.
CPC ....... *G02B 27/0172* (2013.01); *G02B 27/017* (2013.01); *G02B 2027/0123* (2013.01)

(58) Field of Classification Search
CPC .............. G02B 27/0172; G02B 27/017; G02B 2027/0123; G09G 2340/0442; H04N 7/0122
See application file for complete search history.

(56) References Cited

U.S. PATENT DOCUMENTS

| | | | |
|---|---|---|---|
| 2006/0007368 A1* | 1/2006 | Slikkerveer | G09F 9/35 349/58 |
| 2008/0088936 A1 | 4/2008 | Tang et al. | |
| 2010/0079356 A1* | 4/2010 | Hoellwarth | G02B 27/017 345/8 |
| 2012/0075169 A1 | 3/2012 | Iba et al. | |
| 2012/0127284 A1* | 5/2012 | Bar-Zeev | G02B 27/017 348/53 |
| 2012/0212406 A1 | 8/2012 | Osterhout et al. | |
| 2013/0002701 A1 | 1/2013 | Ida | |
| 2013/0044487 A1 | 2/2013 | Burrows et al. | |
| 2013/0159914 A1 | 6/2013 | Grigoryev et al. | |
| 2014/0166992 A1 | 6/2014 | Hack et al. | |
| 2014/0177023 A1 | 6/2014 | Gao et al. | |
| 2014/0320383 A1 | 10/2014 | Goto et al. | |
| 2015/0154936 A1 | 6/2015 | Lee et al. | |

(Continued)

FOREIGN PATENT DOCUMENTS

| | | |
|---|---|---|
| JP | 2002-228972 A | 8/2002 |
| JP | 2009-157026 A | 7/2009 |

(Continued)

*Primary Examiner* — Alicia M Harrington
(74) *Attorney, Agent, or Firm* — Innovation Counsel LLP

(57) ABSTRACT

A head mounted display (HMD) device includes a stretchable display configured to display an image, and a lens unit provided to face the stretchable display and configured to magnify the image and refract the image in a direction toward a user's eye.

15 Claims, 6 Drawing Sheets

(56) References Cited

U.S. PATENT DOCUMENTS

2016/0085319 A1 3/2016 Kim et al.
2017/0344105 A1* 11/2017 Mullen ................ G06F 1/1624

FOREIGN PATENT DOCUMENTS

| KR | 10-1997-0001786 Y1 | 1/1997 |
| KR | 10-1998-0057554 U | 10/1998 |
| KR | 10-0245332 B1 | 11/1999 |

* cited by examiner

[Prior Art]

[Related Art]

HEAD-MOUNTED DISPLAY DEVICE

CROSS-REFERENCE TO RELATED APPLICATION

This application is a continuation of U.S. patent application Ser. No. 14/749,210 filed on Jun. 24, 2015, claims priority to and the benefit of Korean Patent Application No. 10-2015-0003527 filed in the Korean Intellectual Property Office on Jan. 9, 2015, the entire contents of which are incorporated herein by reference.

BACKGROUND

(a) Field

The present disclosure relates to a head-mounted display device. More particularly, the present disclosure relates to a head-mounted display device mounted on a user's head and configured to display an image.

(b) Description of the Related Art

A head-mounted display (HMD) device is mounted on a user's head and configured to display an image, and has recently emerged as a visualizing apparatus for providing virtual reality and augmented reality.

A conventional head-mounted display device includes a display configured to display an image and a lens disposed between the display and a user's eye and configured to magnify the image and refract the image to the user's eye.

The above information disclosed in this Background section is only for enhancement of understanding of the background of the disclosure and therefore may contain information that does not form the prior art that is already known in this country to a person of ordinary skill in the art.

SUMMARY

The present disclosure provides a head-mounted display device that offers an improved perception of reality and presence.

An exemplary embodiment provides a head-mounted display (HMD) device including: a stretchable display configured to display an image; and a lens unit provided to face the stretchable display and configured to magnify the image and refract the image in a direction toward a user's eye.

A deformation unit connected to the stretchable display and configured to increase an area of the stretchable display may be further included.

The deformation unit may increase the area of the stretchable display so that an aspect ratio of the area of the stretchable display is matched with an aspect ratio of the image.

The deformation unit may lengthen the stretchable display in at least any one direction of a transverse direction and a longitudinal direction.

The area of the stretchable display may have an initial aspect ratio of 16:9.

The deformation unit may bend the stretchable display so that a surface of the stretchable display has a curvature.

The stretchable display may include an organic light emitting element.

According to an exemplary embodiment of the above-described present system and method, there is provided a head-mounted display device that offers an improved perception of reality and presence.

DETAILED DESCRIPTION

Figure 1:
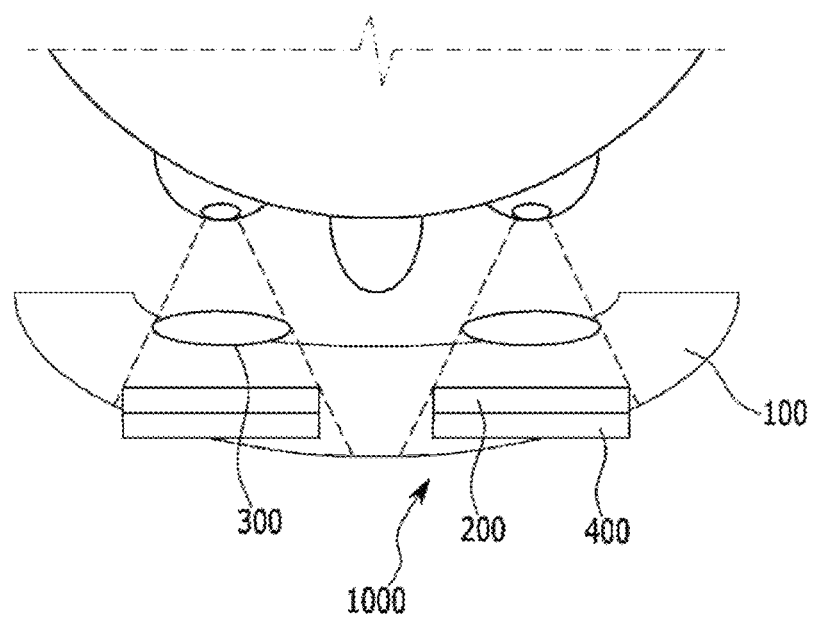
FIG. 1 is a drawing illustrating a head-mounted display device according to an exemplary embodiment of the present system and method.

Hereinafter, exemplary embodiments are described in detail with reference to accompanying drawings so as to be easily realized by a person having ordinary knowledge in the art. However, the present system and method may be embodied in various forms and are not limited to the exemplary embodiments set forth herein.

In the drawings, unrelated parts are omitted in an effort to clearly explaining the present system and method and to prevent obfuscation of the teachings herein. Like reference numerals refer to like constituent elements throughout the specification.

Further, constituent elements having the same configuration across several exemplary embodiments are representatively described in a first exemplary embodiment by using the same reference numeral. Only constituent elements other than the constituent elements described in the first exemplary embodiment are described in other embodiments.

Furthermore, since the size and thickness of each component illustrated in the drawings are arbitrarily represented for convenience in explanation, the present system and method are not limited to the drawings.

In addition, unless explicitly described to the contrary, the word "comprise" and variations such as "comprises" or "comprising", imply the inclusion of stated elements but not the exclusion of any other elements.

Hereinafter, referring to FIG. 1 to FIG. 2, a head-mounted display device according to an exemplary embodiment is described.

FIG. 1 is a drawing illustrating a head-mounted display device according to an exemplary embodiment of the present system and method.

As illustrated in FIG. 1, the head-mounted display device 1000 is a device mounted on a user's head and configured to display an image to each of the eyes of the user. The head-mounted display device 1000 includes a mounted main body 100, a stretchable display 200, a lens unit 300, and a deformation unit 400.

The mounted main body 100 is configured to support the stretchable display 200, the lens unit 300, and the deformation unit 400, and to be mounted on the user's head. The mounted main body 100 may be formed into any shape as long as it can be mounted on the user's head while supporting the stretchable display 200, the lens unit 300, and the deformation unit 400. The mounted main body 100 may have various publicly-known shapes, for example, the shape of glasses or the shape of a helmet.

The stretchable display 200 is stretchable and formed so that its area of display can be increased or reduced. The stretchable display 200 includes a plurality of pixels for displaying an image. Herein, a pixel may refer to a minimum unit for displaying an image. The stretchable display 200 may include an organic light emitting diode (OLED) as a pixel for displaying an image, and may further include at least one scan wires, one or more data wires, a plurality of thin film transistors and at least one capacitor for emitting the organic light emitting element. The stretchable display 200 may have various publicly-known structures as long as it is stretchable. The stretchable display 200 may have a quadrangular flat surface, and an area of the stretchable display 200 may have an initial aspect ratio of 16:9.

The present system and method, however, are not limited to the stretchable display 200 described above. A stretchable display according to another exemplary embodiment may have a triangular, pentagonal, hexagonal, heptagonal, octagonal, nonagonal, polygonal, circular, oval, or closed loop-shaped flat surface. Further, an area of a stretchable display according to another exemplary embodiment may have an aspect ratio of 1:1, 3:2, 4:3, 1.85:1, or 2.38:1. Furthermore, a stretchable display according to another exemplary embodiment may be various display devices configured to display an image, such as liquid crystal displays (LCDs), plasma displays (PDs), field emission displays (FEDs), electrophoretic displays (EPDs), and electrowetting displays (EWDs). Also, a stretchable display 200 according to another exemplary embodiment may be flexible, foldable, bendable, or rollable.

Further, the stretchable display 200 may be a transparent display, which would allow a user of the head-mounted display device 1000 to simultaneously view the contents displayed on the stretchable display 200 and the physical environment around the user. Thus, the head-mounted display device 1000 can be utilized for augmented reality or virtual reality technologies.

The lens unit 300 is disposed to face the stretchable display 200 and configured to magnify an image displayed on the stretchable display 200 and refract the image in a direction toward the user's eye. The lens unit 300 may include a convex lens that is convex toward the stretchable display 200. The lens unit 300 may include a concave lens for correcting distortion caused by the convex lens, and the concave lens may be an aspheric lens.

The deformation unit 400 is connected to the stretchable display 200 and configured to support the stretchable display 200. The deformation unit 400 can increase or reduce an area of the stretchable display 200. For example, the deformation unit 400 may increase or reduce an area of the stretchable display 200 to match the aspect ratio of the area of the stretchable display 200 to the aspect ratio of the image displayed on the stretchable display 200. The deformation unit 400 may lengthen or shorten the stretchable display 200 in at least one direction of a transverse direction and a longitudinal direction so as to match the aspect ratio of the area of the stretchable display 200 with the aspect ratio of the image displayed on the stretchable display 200. The deformation unit 400 may include a rail-shaped sliding guide and a sliding unit configured to slide along the sliding guide, or may include a robot arm connected by a hinge. The deformation unit 400 may have various publicly-known shapes as long as it can lengthen or shorten the stretchable display 200.

Figure 2:
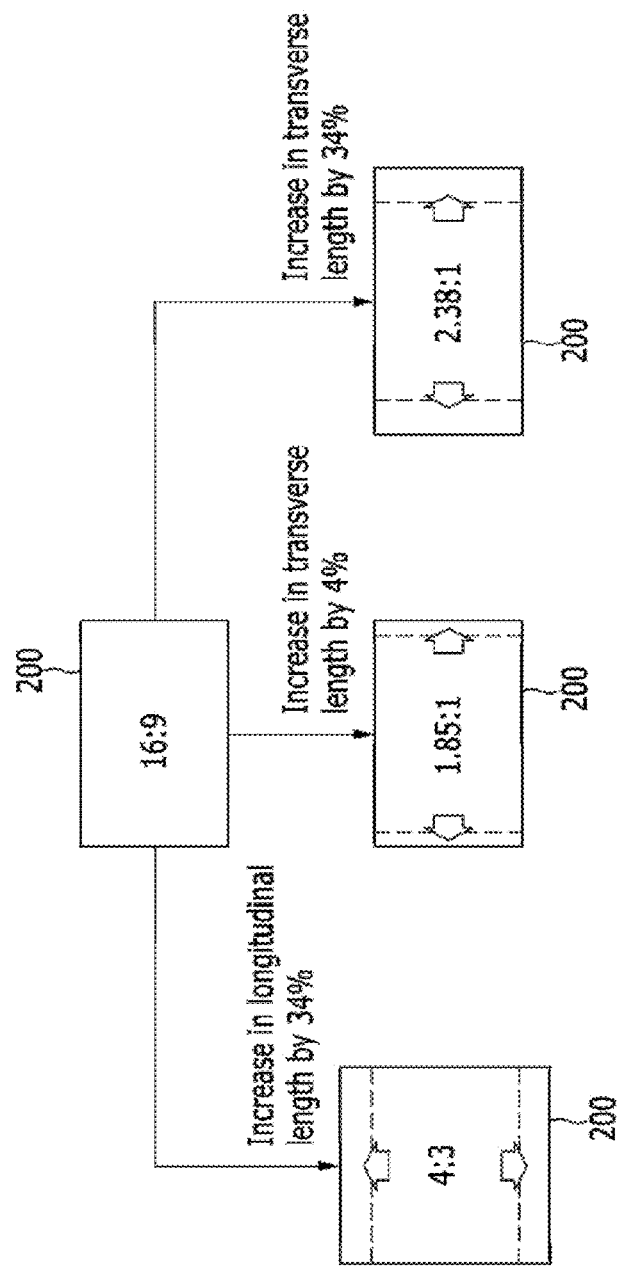
FIG. 2 is a drawing illustrating an example in which an area of a stretchable display of the head-mounted display device illustrated in FIG. 1 is increased.

FIG. 2 is a drawing illustrating an example in which an area of a stretchable display of the head-mounted display device illustrated in FIG. 1 is increased.

As illustrated in FIG. 2, an area of the stretchable display 200 has an initial aspect ratio of 16:9.

Herein, if an aspect ratio of an image displayed on the stretchable display 200 is 4:3, the deformation unit 400 increases the stretchable display 200 by substantially 34% in the longitudinal direction, so that the aspect ratio of the area of the stretchable display 200 is increased from 16:9 to 4:3.

Also, if an aspect ratio of an image displayed on the stretchable display 200 is 1.85:1, the deformation unit 400 increases the stretchable display 200 by substantially 4% in the transverse direction, so that the aspect ratio of the area of the stretchable display 200 can be increased from 16:9 to 1.85:1.

Further, if an aspect ratio of an image displayed on the stretchable display 200 is 2.38:1, the deformation unit 400 increases the stretchable display 200 by substantially 34% in the transverse direction, so that the aspect ratio of the area of the stretchable display 200 can be increased from 16:9 to 2.38:1.

Figure 3A:
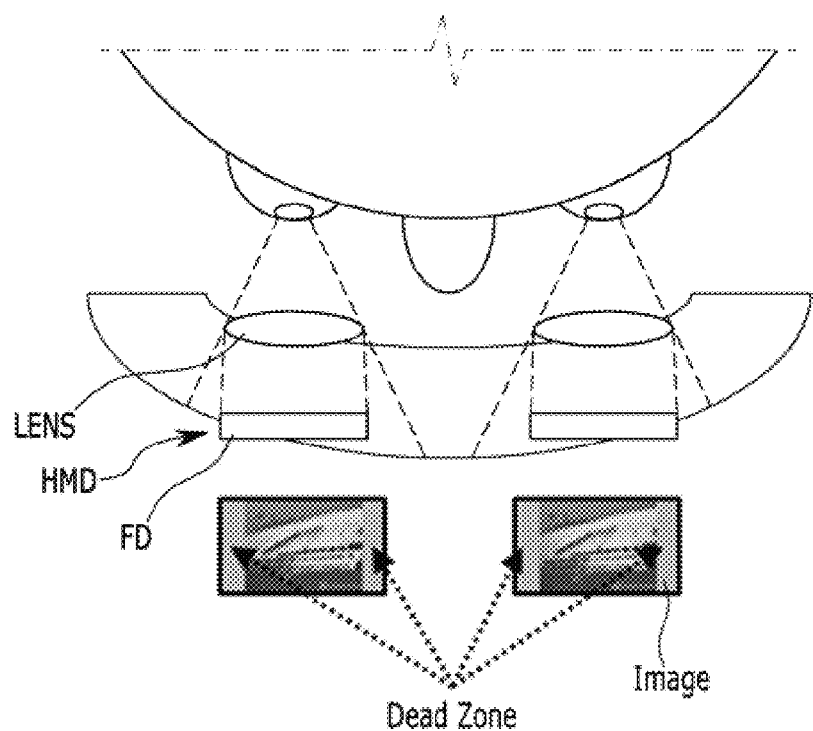
FIGS. 3(a) and 3(b) are drawings provided to explain an effect of a head-mounted display device according to an exemplary embodiment of the present system and method, as compared with a conventional head-mounted display device.
Figure 3B:
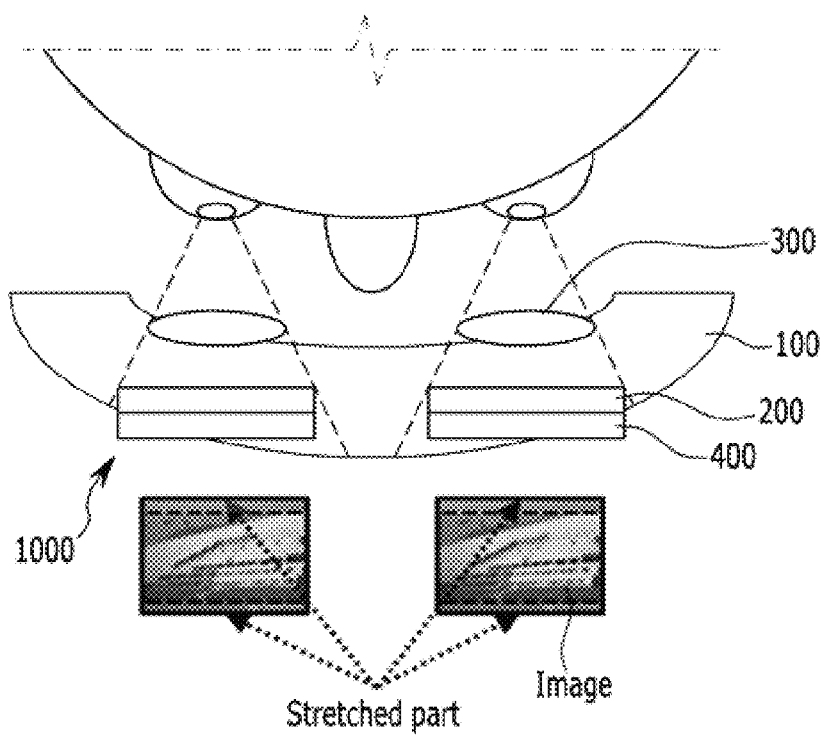

Hereinafter, referring to FIGS. 3(*a*) and 3(*b*), an effect of a head-mounted display device according to an exemplary embodiment is described. FIG. 3(*a*) is a drawing illustrating a conventional head-mounted display device, and FIG. 3(*b*) is a drawing illustrating a head-mounted display device according to an exemplary embodiment of the present system and method.

A conventional head-mounted display device (HMD) illustrated in FIG. 3(*a*) includes a lens unit (LENS) and a flat display (FD). The flat display (FD) is a rigid display and has an aspect ratio of 16:9. If the conventional flat display (FD) displays an image (IMAGE) having an aspect ratio of 4:3, a user recognizes a dead zone (Dead Zone) where the image is not displayed at both ends of the flat display (FD). Since such a dead zone is recognized by the user while using the conventional head-mounted display device (HMD), the user's perception of reality and presence is deteriorated.

According to an exemplary embodiment illustrated in FIG. 3(*b*), the display area of the stretchable display 200 in the head-mounted display device 1000 has an aspect ratio of 16:9. If the stretchable display 200 displays an image (IMAGE) having an aspect ratio of 4:3, the deformation unit 400 lengthens the stretchable display 200 in the longitudinal direction so that the aspect ratio of the display area of the stretchable display 200 is increased from 16:9 to 4:3. Thus, the image displayed on the stretchable display 200 is displayed throughout the entire area of the stretchable display 200, including a stretched part of the stretchable display 200, and a dead zone does not exist in any part of the stretchable display 200. That is, since the aspect ratio of the area of the stretchable display 200 is matched with the aspect ratio of the image displayed on the stretchable display 200, the image is displayed throughout the entire stretchable display 200. Thus, the user does not see a dead zone while using the head-mounted display device 1000, and the user's perception of reality and presence is improved.

As such, the head-mounted display device 1000 provides the user with an improved sense of reality and presence.

Hereinafter, referring to FIG. 4(*b*), a head-mounted display device according to another exemplary embodiment is described. Hereinafter, components other than the components of the head-mounted display device according to the above-described exemplary embodiment are described.

FIG. 4(*a*) is a drawing illustrating a conventional head-mounted display device, and FIG. 4(*b*) is a drawing illustrating a head-mounted display device according to another exemplary embodiment of the present system and method.

Figure 4A:
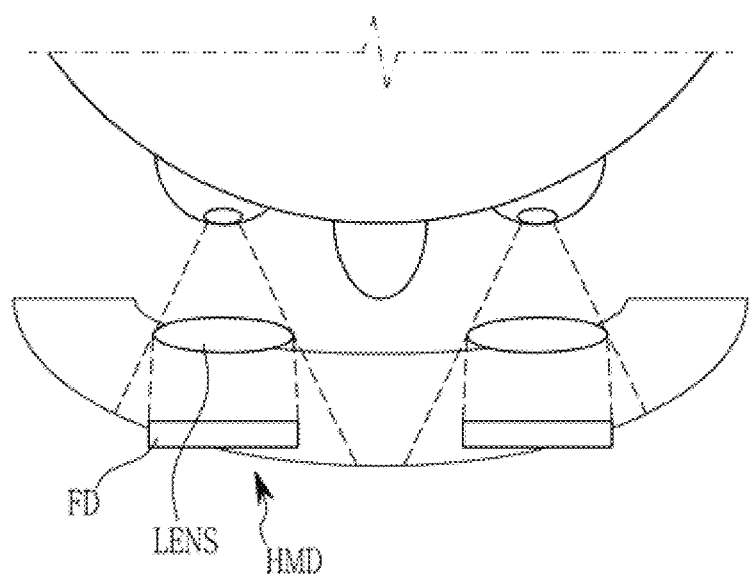
FIGS. 4(a) and 4(b) are drawings illustrating a conventional head-mounted display device and a head-mounted display device according to another exemplary embodiment of the present system and method.
Figure 4B:
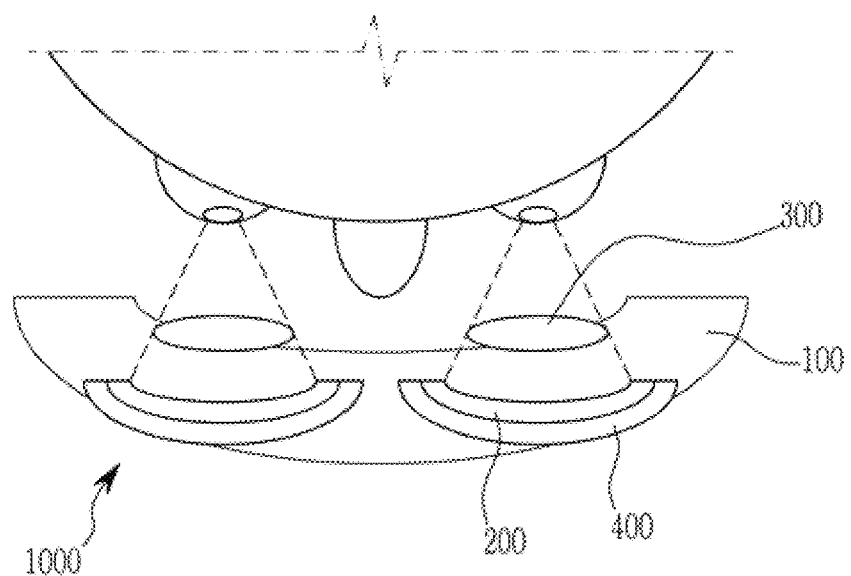

As illustrated in FIG. 4(b), in a head-mounted display device 1000 according to another exemplary embodiment of the present system and method, a deformation unit 400 bends a stretchable display 200 so that a display surface of the stretchable display 200 has a curvature. The deformation unit 400 may bend the stretchable display 200 so that the display surface of the stretchable display 200 facing the user is concave or convex toward the user's eye.

A conventional head-mounted display device (HMD) illustrated in FIG. 4(a) includes a lens unit (LENS) and a flat display (FD). The display area of the flat display (FD) has an aspect ratio of 16:9. If the conventional flat display (FD) displays an image (IMAGE) having an aspect ratio of 4:3, the user recognizes a dead zone (Dead Zone) where the image is not displayed at both ends of the flat display (FD). Since such a dead zone is recognized by the user while using the conventional head-mounted display device (HMD), the user's perception of reality and presence is deteriorated.

According to another exemplary embodiment illustrated in FIG. 4(b), the display area of the stretchable display 200 in the head-mounted display device 1000 has an aspect ratio of 16:9. If the stretchable display 200 displays an image (IMAGE) having an aspect ratio of 4:3, the deformation unit 400 lengthens the stretchable display 200 in the longitudinal direction so that the aspect ratio of the display area of the stretchable display 200 is increased from 16:9 to 4:3. Thus, the image displayed on the stretchable display 200 is displayed throughout the entire area of the stretchable display 200, including a stretched part of the stretchable display 200, and a dead zone does not exist in any part of the stretchable display 200. That is, since the aspect ratio of the area of the stretchable display 200 is matched with the aspect ratio of the image displayed on the stretchable display 200, the image is displayed throughout the entire stretchable display 200. Thus, the user does not see a dead zone while using the head-mounted display 1000, and the user's perception of reality and presence is improved.

Further, the stretchable display 200 of the head-mounted display device 1000 according to another exemplary embodiment is bent by the deformation unit 400 so that the display surface of the stretchable display 200 has a curvature. The curved display surface of the head-mounted display device 1000 provides the user with an improved three-dimensional effect.

As such, the head-mounted display device 1000 provides the user with an improved sense of reality, presence, and three-dimensional effect.

While the present system and method have been described in connection with exemplary embodiments, the present system and method are not limited to the disclosed embodiments. On the contrary, the present system and method covers various modifications and equivalent arrangements included within the spirit and scope of the appended claims.

What is claimed is:

1. A head-mounted display (HMD) device comprising:
a stretchable display configured to display an image;
a deformation unit connected to the stretchable display and configured to control a size of the stretchable display; and
a lens unit provided to face the stretchable display and configured to magnify the image and refract the image in a direction toward a user's eye,
wherein the deformation unit includes a rail-shaped sliding guide, and
the deformation unit controls the size of the stretchable display such that an aspect ratio of the size of the stretchable display is matched with an aspect ratio of an image displayed on the stretchable display.

2. The head-mounted display device of claim 1, wherein:
the deformation unit increases the size of an entire surface area of the stretchable display.

3. The head-mounted display device of claim 2, wherein:
the deformation unit lengthens the stretchable display in at least any one direction of a transverse direction and a longitudinal direction.

4. The head-mounted display device of claim 1, wherein:
the deformation unit decreases the size of an entire surface area of the stretchable display.

5. The head-mounted display device of claim 4, wherein:
the deformation unit shortens the stretchable display in at least any one direction of a transverse direction and a longitudinal direction.

6. The head-mounted display device of claim 1, wherein:
an entire surface area of the stretchable display has an initial aspect ratio of 16:9.

7. The head-mounted display device of claim 1, wherein:
the stretchable display includes an organic light emitting element.

8. The head-mounted display device of claim 1, wherein:
the deformation unit includes a sliding unit which slides along the rail-shaped sliding guide.

9. A head-mounted display (HMD) device comprising:
a stretchable display configured to display an image;
a deformation unit connected to the stretchable display and configured to control a size of an entire surface area of the stretchable display; and
a lens unit provided to face the stretchable display and configured to magnify the image and refract the image in a direction toward a user's eye,
wherein the deformation unit includes a robot arm connected by a hinge, and
the deformation unit controls the size of the stretchable display such that an aspect ratio of the size of the stretchable display is matched with an aspect ratio of an image displayed on the stretchable display.

10. The head-mounted display device of claim 9, wherein:
the deformation unit increases the size of the entire surface area of the stretchable display.

11. The head-mounted display device of claim 10, wherein:
the deformation unit lengthens the stretchable display in at least any one direction of a transverse direction and a longitudinal direction.

12. The head-mounted display device of claim 9, wherein:
the deformation unit decreases the size of the entire surface area of the stretchable display.

13. The head-mounted display device of claim 12, wherein:
the deformation unit shortens the stretchable display in at least any one direction of a transverse direction and a longitudinal direction.

14. The head-mounted display device of claim 9, wherein:
the entire surface area of the stretchable display has an initial aspect ratio of 16:9.

15. The head-mounted display device of claim 9, wherein:
the stretchable display includes an organic light emitting element.

* * * * *